United States Patent [19]

Ito et al.

[11] Patent Number: 4,954,885
[45] Date of Patent: Sep. 4, 1990

[54] FILTER FOR SEPARATING LUMINANCE AND CHROMINANCE SIGNALS FROM COMPOSITE COLOR TELEVISION SIGNAL

[75] Inventors: Hiroshi Ito; Tadashi Kasezawa; Masaharu Yao, all of Nagaokakyo, Japan

[73] Assignee: Mitsubishi Denki Kabushiki Kaisha, Chiyoda, Japan

[21] Appl. No.: 160,332

[22] Filed: Feb. 25, 1988

[30] Foreign Application Priority Data

| | | | |
|---|---|---|---|
| Feb. 25, 1987 | [JP] | Japan | 62-43426 |
| Mar. 19, 1987 | [JP] | Japan | 62-66855 |
| Mar. 19, 1987 | [JP] | Japan | 62-66856 |
| Mar. 19, 1987 | [JP] | Japan | 62-66857 |
| Mar. 19, 1987 | [JP] | Japan | 62-66858 |
| Mar. 19, 1987 | [JP] | Japan | 62-66859 |

[51] Int. Cl.$^5$ .............................................. H04N 9/78
[52] U.S. Cl. ........................................................ 358/31
[58] Field of Search ............................................. 358/31

[56] References Cited

U.S. PATENT DOCUMENTS

| | | | |
|---|---|---|---|
| 4,754,322 | 6/1988 | Okuda et al. | 358/31 |
| 4,789,890 | 12/1988 | Itoh et al. | 358/31 |

FOREIGN PATENT DOCUMENTS

| | | | |
|---|---|---|---|
| 139090 | 7/1985 | Japan | 358/31 |
| 226292 | 11/1985 | Japan | 358/31 |
| 186095 | 8/1986 | Japan | . |
| 12291 | 1/1987 | Japan | . |
| 133888 | 6/1987 | Japan | . |

*Primary Examiner*—John W. Shepperd
*Attorney, Agent, or Firm*—Birch, Stewart, Kolasch & Birch

[57] ABSTRACT

A filtering circuit separates from the composite color television signal both the luminance and chrominance signals that includes a delay circuit for delaying the composite color video signal. A first filter is also provided which is responsive to the video signal and the delayed video signal and extracts a chrominance signal corresponding to a frequency component of a color subcarrier in a vertical direction. A second filter is used which is responsive to at least the delayed video signal and extracts a chrominance signal corresponding to a frequency component of the color subcarrier in a horizontal direction. Lastly, a third filter is utilized which is responsive to the video signal and the delayed video signal and extracts a chrominance signal corresponding to a frequency component of the color subcarrier in both the vertical and horizontal direction. This filter circuit then determines, in response to the video signal and the delayed video signal, a correlation in a televised picture in the vertical and horizontal directions, respectively. In accordance with this determination, a switching circuit selects one of the chrominance signals extracted, respectively, by the first to third filters as an output.

5 Claims, 12 Drawing Sheets

Fig. 2

```
                        S(m,n-2)
--△---⊘---△---○---△---⊘---△---○---△--  Line n-2
                        S(m,n-1)
--△---○---△---⊘---△---○---△---⊘---△--  Line n-1
         S(m-2,n) S(m,n)  S(m+2,n)
--△---⊘---△---○---△---⊘---△---○---△--  Line n
                        S(m,n+1)
--△---○---△---⊘---△---○---△---⊘---△--  Line n+1
                        S(m,n+2)
--△---⊘---△---○---△---⊘---△---○---△--  Line n+2
```

| Output of Circuit 13b | Output of Circuit 13a | Output of Gate 15 | Output of Gate 16a |
|---|---|---|---|
| 0 | 0 | 1 | 1 |
| 0 | 1 | 0 | 1 |
| 1 | 0 | 0 | 0 |
| 1 | 1 | 0 | 0 |

Fig. 8

| Output of Circuit 13b | Output of Circuit 13a | Output of Gate 17 | Output of Gate 18 |
|---|---|---|---|
| 0 | 0 | 1 | 0 |
| 0 | 1 | 0 | 1 |
| 1 | 0 | 0 | 0 |
| 1 | 1 | 1 | 0 |

Fig. 14

| Output of Circuit 13b | Output of Circuit 13a | Output of Gate 15 | Output of Gate 16a |
|---|---|---|---|
| 0 | 0 | 1 | 1 |
| 0 | 1 | 0 | 1 |
| 1 | 0 | 0 | 0 |
| 1 | 1 | 0 | 0 |

Fig. 15

| Output of Circuit 13b | Output of Circuit 13a | Output of Gate 17 | Output of Gate 16b |
|---|---|---|---|
| 0 | 0 | 1 | 1 |
| 0 | 1 | 0 | 1 |
| 1 | 0 | 0 | 0 |
| 1 | 1 | 1 | 0 |

FILTER FOR SEPARATING LUMINANCE AND CHROMINANCE SIGNALS FROM COMPOSITE COLOR TELEVISION SIGNAL

BACKGROUND OF THE INVENTION

1. Field of the Invention

The present invention generally relates to a color television signal separating filter in a television receiver set, and more particularly, to a color television signal filtering circuit for separating both a luminance signal and a chrominance signal from a composite color television signal or composite color video signal utilizing a NTSC scheme depending upon the correlation of pictures in vertical and horizontal directions.

2. Description of the Prior Art

It is well known that a television receiver set utilizing the NTSC scheme is provided with a color television signal filtering circuit for separating both a luminance signal and a chrominance signal from a televised composite color television signal. For the purpose of discussion of the prior art filtering circuit of the type referred to above, reference will now be made to FIG. 1 of the accompanying drawings.

As shown in FIG. 1, the prior art filtering circuit has an input terminal 1 to which a televised composite color television signal is applied. This composite color television signal is in turn fed through an analog-to-digital converter 4 to a vertical direction filter 6j and also to a front one-line delay circuit 5i. An output from the front one-line delay circuit 5i is supplied to the vertical direction filter 6j both directly and through a another one-line delay circuit 5j which acts to delay the output from the front one-line delay circuit 5i for a length of time corresponding to one scanning line period. The vertical direction filter 6j is generally referred to as a two-line comb filter having its output coupled to a horizontal filter 6k which provides a chrominance signal 205 to an output terminal 2 and also to a first input terminal of a subtracting circuit 9d having its second input terminal adapted to receive an output from the front one-line delay circuit 5i through a compensating delay circuit 5k which is utilized to compensate for the delay occurring in the horizontal filter 6k. The subtracting circuit 9d provides as its output a luminance signal 207 which emerges from an output terminal 3.

The filtering circuit of the above described construction operates in the following manner relative to the composite color television signal based on the NTSC scheme.

The composite color television signal 201 sampled in synchronism with a color subcarrier at a sampling frequency of fs=4·fsc wherein fsc represents the color subcarrier frequency, when reproduced on a phosphor screen of a cathode ray tube, represents a two dimensional grid pattern as shown in FIG. 2 wherein reference character Y represents the luminance signal and reference characters C1 and C2 represent respective chrominance signals. Specifically, since according to the NTSC scheme the parameter fsc is equal to (455/2)·fH, wherein fH represents the horizontal scanning frequency, the phase of the chrominance signal C for each horizontal scanning line corresponds to the chrominance signal shifted 180° in phase and extracted four samples for each cycle. Let it be assumed that with the use of a Z transform, the one-sample delay and the one-line delay are, respectively, expressed by $Z^{-1}$ and $Z^{-\iota}$, and the following relationship can be obtained.

$$Z^{-1} = exp \cdot (-j2\pi f/4 \cdot fsc)$$

Since fsc=(455/2)·fH, $\iota$=910.

The vertical direction filter 6j then operates to process the one-line delayed output from the front one-line delay circuit 5i and the two-line delayed output from the rear one-line delay circuit 5j to extract and provide a line support signal 204, including the chrominance signal, which signal 204 is in turn applied to the horizontal filter 6k. The transfer function Hv(Z) of the vertical direction filter 6j is expressed by the following equation.

$$Hv(Z) = (-\tfrac{1}{4}) \cdot (1 - Z^{-\iota})^2$$

In other words, the vertical direction filter 6j operates to extract the line support signal Hc(m, n) which is expressed by the following equation, wherein (m, n) represent respective points on the axes of abscissas and ordinates on the screen of the cathode ray tube shown in FIG. 2 being taken as the system of coordinates.

$$Hc(m, n) = (-\tfrac{1}{4}) \cdot [S(m, n-1) - 2S(m, n) + S(m, n+1)]$$

Since the line support signal contains the luminance signal Y, the chrominance signal C(m, n) which is a high frequency component is separated by the horizontal filter 6k from the line support signal Hc(m, n). The chrominance signal 205 so separated from the line support signal is in turn not only outputted through the output terminal 2, but also applied to the subtracting circuit 9d. The subtracting circuit 9d then operates to subtract the chrominance signal C(m, n) 205 from that signal S(m, n) which is a version of the one-line delayed output from the front one-line delay circuit 5i delayed by the compensating delay circuit 5k for a length of time determined by the operating characteristic of the horizontal filter 6k, thereby providing the luminance signal Y(m, n) 207. In other words, the subtracting circuit 9d operates to execute the following equation.

$$Y(m, n) = S(m, n) - C(m, n)$$

The transfer function Hh(Z) of the horizontal filter 6k may be the one such as expressed by the following equation.

$$Hh(Z) = (-1/32) \cdot (1 - Z^{-2})^2 \cdot (1 + Z^{-4})^2 \cdot (1 + Z^{-8})$$

The prior art color television signal filtering circuit of the above described construction has some problems. More specifically, the prior art color television signal filtering circuit employs a combination of a vertical direction filter and a horizontal direction filter both having a fixed operating characteristic, such that both of the luminance signal and the chrominance signal in each of the vertical and horizontal directions can be separated from the composite color television signal. According to this prior art method, it has often been observed that, at a region of the reproduced picture where change in both of the brightness and the color is considerable, the luminance signal and the chrominance signal tend to leak into mutual channels resulting in the reproduction of the television picture in which interference of dots occurs. Thus, the prior art color television signal filtering circuit constitutes one of the major causes of deterioration in quality of the reproduced television pictures known as a dot crawl.

SUMMARY OF THE INVENTION

Therefore, the present invention has been devised to substantially eliminate the above described problems and disadvantages inherent in the prior art filtering circuit and has for its primary object to provide an improved color television signal filtering circuit capable of separating from the composite color television signal both the luminance signal and the chrominance signal accurately even when an abrupt change in signal occur during the television picture being reproduced on the screen.

To achieve this result the present invention includes a color television signal filtering circuit for separating from the composite color television signal both the luminance and chrominance signals. This circuit is provided with a delay means for delaying a sampling signal, inputted to the filtering circuit, for obtaining simultaneously a sampling point of interest and sampling points in the vicinity of the sampling point of interest, and a picture correlation determining means for detecting a correlation of a televised picture in a vertical direction and also a correlation of the televised picture in a horizontal direction in reference to the sampling point of interest and the sampling points in the vicinity of the sampling point of interest on the screen, so that, depending on the result of the detection made by the determining means either an output from a horizontal direction filter, a vertical direction filter, or a horizontal direction or vertical direction filter can be utilized as an output from the filtering circuit.

Specifically, the filtering circuit, according to one preferred embodiment of the present invention, comprises an input terminal to which a composite video signal is supplied, an output terminal; a delay means for delaying the composite color television signal applied to the input terminal; a first filter, responsive to the composite video signal and the delayed composite video signal from the delay means, for extracting a chrominance signal corresponding to a frequency component of a color subcarrier in a vertical direction; a second filter, responsive to at least the composite video signal, for extracting a chrominance signal corresponding to a frequency component of the color subcarrier in a horizontal direction; a third filter, responsive to the composite video signal and the delayed composite video signal from the delay means, for extracting a chrominance signal corresponding to a frequency component of the color subcarrier in both of the vertical and horizontal directions; a determining means, responsive to the composite video signal and the delayed composite video signal from the delay means, for detecting a correlation of a televised picture in the vertical direction and a correlation of the televised picture in the horizontal direction and for outputting a switching signal; and a switching means, responsive to the switching signal from the determining means, for selecting one of the chrominance signals extracted from one of the first to third filters, to the output terminal.

According to the present invention, the filters used to separate the chrominance signal from the composite color television signal are selectively used in dependence on the correlation of the televised picture in the vertical direction and that in the horizontal direction. Therefore, any possible leakage of the luminance signal and the chrominance signal from one channel to the neighboring channel at a region where a change in the picture image is considerable can be minimized with the consequent minimization of any possible dot crawl.

BRIEF DESCRIPTION OF THE DRAWINGS

The present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

FIG. 2 is a diagram showing an arrangement of signal systems on a television screen which are synchronously sampled at a frequency four times the frequency of the color subcarrier in the composite color television signal according to the NTSC scheme;

FIGS. 7 and 8 are logic tables illustrating logical level states of signals appearing in the circuits of FIGS. 5 and 6, respectively;

FIGS. 14 and 15 are diagrams similar to FIGS. 7 and 8, but pertaining to the picture correlation determining device shown in FIG. 13.

DETAILED DESCRIPTION OF THE EMBODIMENTS

Figure 1:
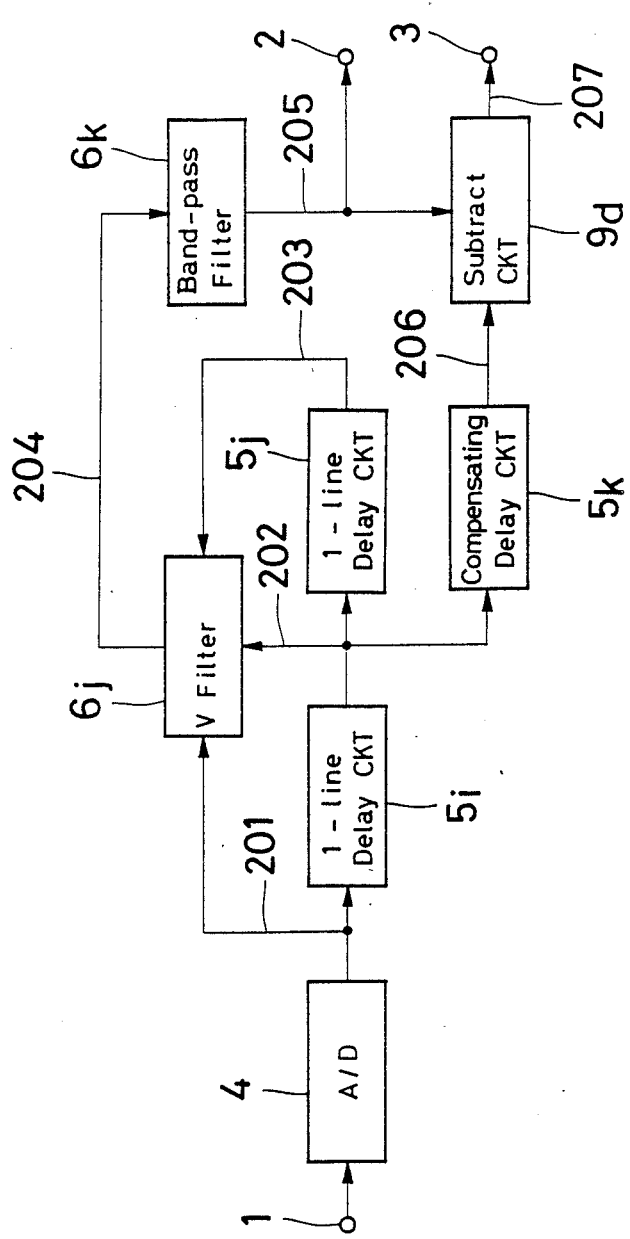
FIG. 1 is a block diagram showing the prior art color television signal filtering circuit.

In the description of the present invention, it should be noted that like parts are designated by like reference numerals throughout the several views of the accompanying drawings.

Figure 3:
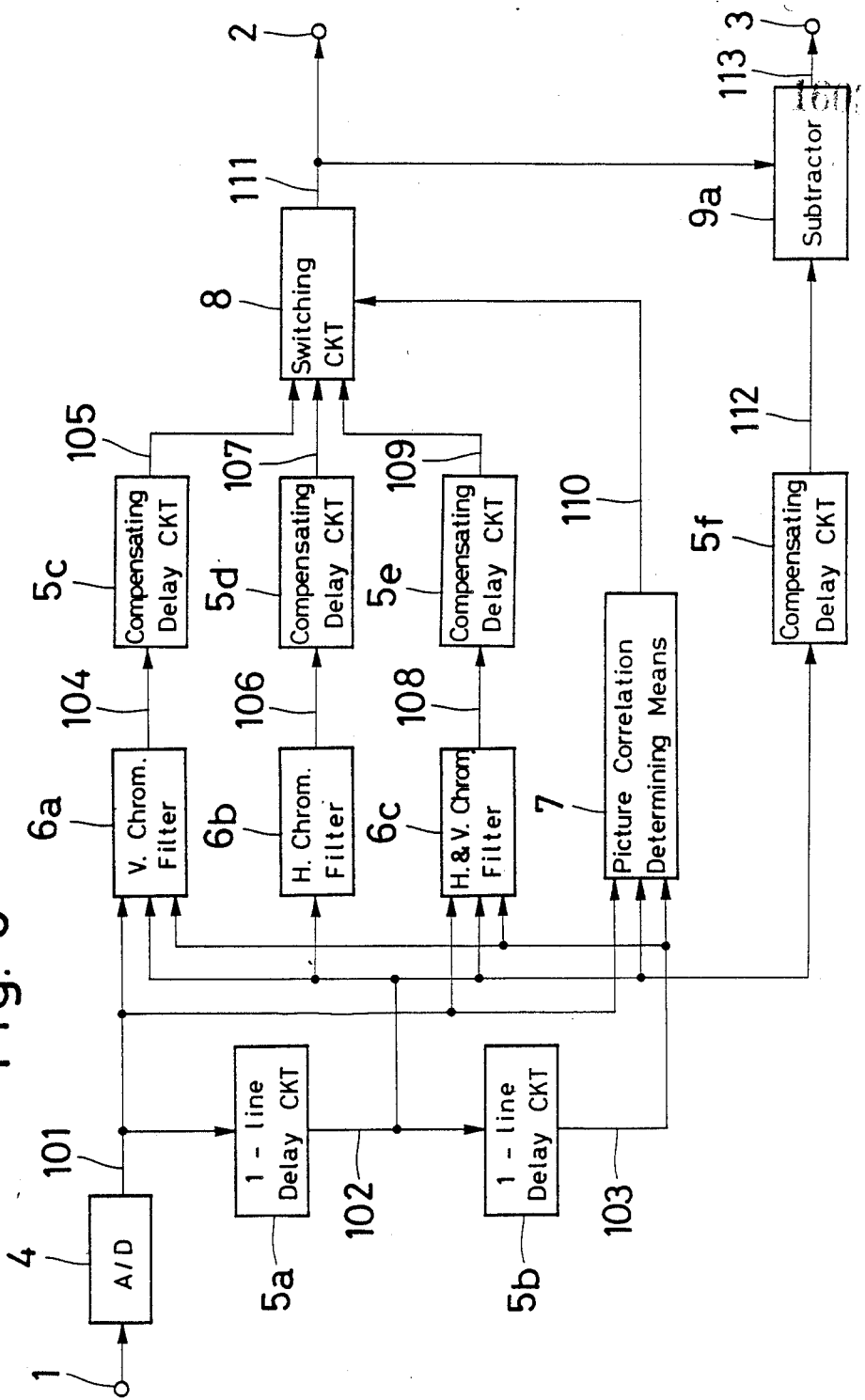
FIG. 3 is a circuit block diagram showing a filtering circuit used in the present invention to separate both the luminance signal and the chrominance signal from the composite color television signal.

Referring to FIG. 3, the filtering circuit shown therein has an input terminal 1 to which a televised composite color television signal is supplied. This composite color television signal is in turn fed to the analog-to-digital converter 4. This A/D converter 4 is so constructed so that the composite color television signal can be sampled at the sampling frequency of fs=4·fsc. The composite color television signal so sampled by the A/D converter 4 is subsequently supplied to a one-line delay circuit 5a and then to another one-line delay circuit 5b, whereby the sampling value of a sampling point of interest and respective sampling values of sampling points located one-line above or below on the televised picture being then reproduced on the screen of a cathode ray tube can be simultaneously extracted. Signals indicative of the sampling values so extracted are supplied to a vertical direction chrominance signal separator 6a, a horizontal direction chrominance signal separator 6b, a horizontal and vertical direction chrominance separator 6c and a picture correlation determining means 7 in a manner which will now be described.

As shown, respective outputs 101, 102 and 103, from the A/D converter 4, the one-line delay circuit 5a and the one-line delay circuit 5b, are coupled to one input terminal of each of the following circuits: the vertical chrominance signal separator 6a, the horizontal and vertical direction chrominance signal separator 6c and the picture correlation determining means 7. Only the output 102 from the front one-line delay circuit 5a is also supplied to the horizontal direction chrominance signal separator 6b.

The vertical direction chrominance signal separator 6a may be a filter having a transfer function Cv(Z) which is expressed as follows.

$$Cv(Z)=(-\tfrac{1}{4})\cdot(1-Z^{-t})^2$$

The horizontal direction chrominance signal separator 6b may be a filter having a transfer function Ch(Z) which is expressed as follows.

$$Ch(Z)=(-\tfrac{1}{4})\cdot(1-Z^{-2})^2$$

The horizontal and vertical direction chrominance signal separator 6c may be of a filter having a transfer function Chv(Z) which is expressed as follows.

$$Chv(Z)=[(-\tfrac{1}{4})\cdot(1-Z^{-2})^2]\cdot[(-\tfrac{1}{4})\cdot(1-Z^{-t})^2]$$

The vertical direction chrominance signal separator 6a provides an output 104 to a first compensating delay circuit 5c which in turn provides an output 105 to a first input terminal of a switching circuit 8. The horizontal direction chrominance signal separator 6b provides an output 106 to a second compensating delay circuit 5d which in turn provides an output 107 to a second input terminal of the switching circuit 8. The horizontal and vertical direction chrominance signal separator 6c provides an output 108 to a third compensating delay circuit 5e which in turn provides an output 109 to a third input terminal of the switching circuit 8. The picture correlation determining means 7 provides an output 110 directly to a fourth input terminal of the switching circuit 8.

The switching circuit 8 provides the chrominance signal as an output 111 to the output terminal 2 and also to a subtracting circuit 9a to which the output 102 from the one-line delay circuit 5a is applied through a fourth compensating delay circuit 5f. The output from this delay circuit 5f is identified by 112. The subtracting circuit 9a provides the luminance signal as an output 113 to the output terminal 3. It is to be noted that each of the first to fourth compensating delay circuits 5c, 5d, 5e and 5f is utilized to compensate for a delay occurring in the associated output being applied to the respective compensating delay circuit.

Figure 4:
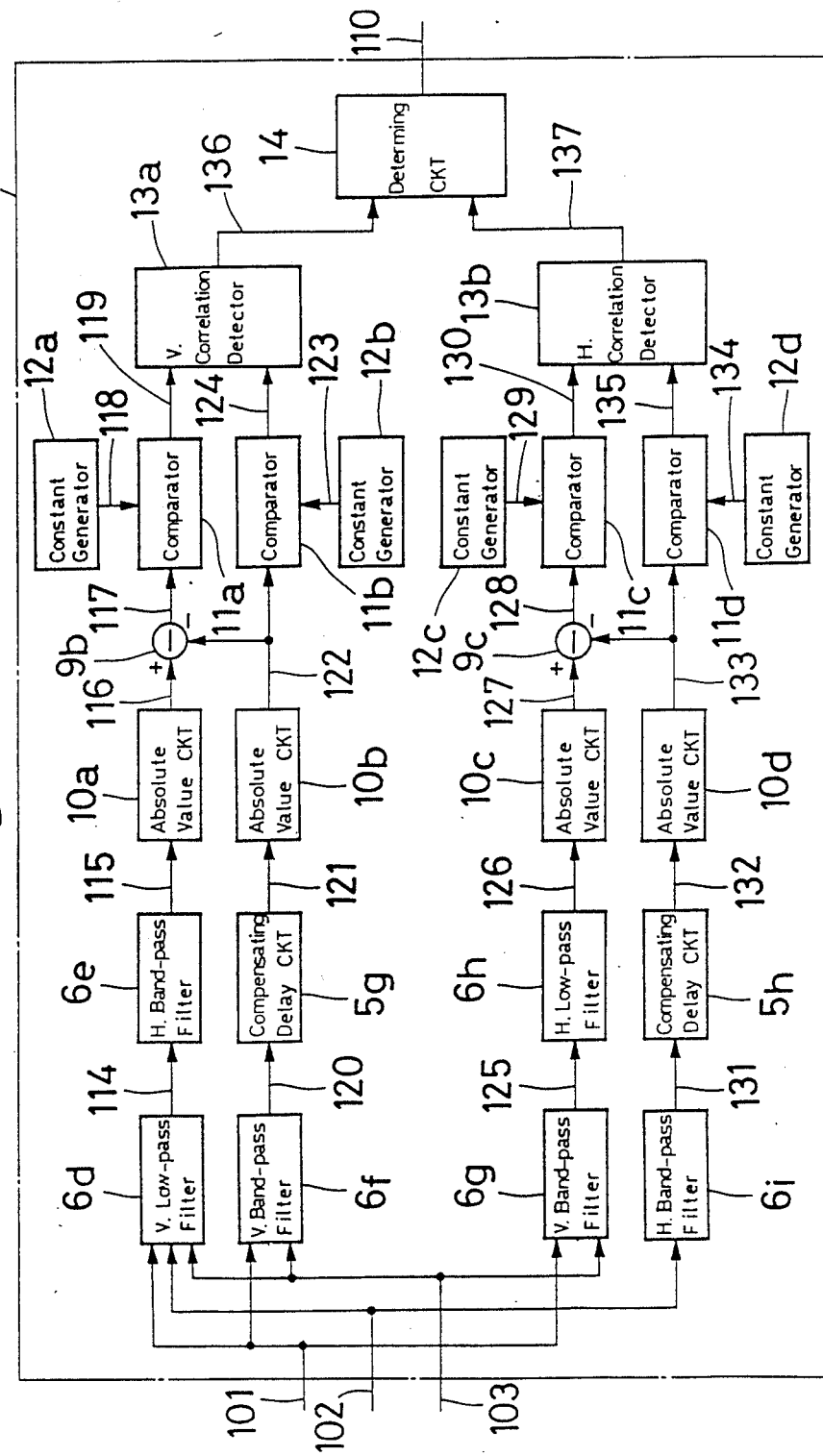
FIG. 4 is a circuit block diagram showing one embodiment of a picture correlation determining device used in the filtering circuit shown in FIG. 3.

One embodiment of the picture correlation determining means 7 is illustrated in FIG. 4, the details of which will now be described.

The picture correlation determining means 7 shown in FIG. 4 includes a vertical direction low pass filter 6d, a first vertical direction band-pass filter 6f, a second vertical direction band-pass filter 6g and a horizontal direction band-pass filter 6i. The output 101 from the A/D converter 4 is supplied to the vertical direction low pass filter 6d, the first vertical direction band-pass filter 6f and the second vertical direction band-pass filter 6g. The output 102 from the one-line delay circuit 5a is supplied to the vertical direction low pass filter 6d, the first vertical direction band-pass filter 6f, the second vertical direction band-pass filter 6g and a first horizontal direction band-pass filter 6i. The output 103 from the one-line delay circuit 5b is supplied to the vertical direction low pass filter 6d, the first vertical direction band-pass filter 6f and the second vertical direction band-pass filter 6g.

The vertical direction low pass filter 6d has its output 114 coupled to one input terminal of a first subtractor 9b through a second horizontal direction band-pass filter 6e and a first absolute value circuit 10a. The respective outputs from the second horizontal direction band-pass filter 6e and the first absolute value circuit 10a are identified by 115 and 116. The first vertical direction band-pass filter 6f has its output 120 coupled to both of another input terminal of the first subtractor 9b and one input terminal of a second comparator 11b through a first compensating delay circuit 5g, which acts to compensate for a delay occurring in an output from the first vertical direction band-pass filter 6f, and a second absolute value circuit 10b. The respective outputs from the first compensating delay circuit 5g and the second absolute value circuit 10b are identified by 121 and 122. The first subtractor 9b has an output 117 coupled to one input terminal of a first comparator 11a having another input terminal adapted to receive an output 118 (Kdy1 as will be described later) from a first constant generator 12a. The second comparator 11b also has another input terminal adapted to receive an output 123 (Kd1 as will be described later) from a second constant generator 12b.

The second vertical band-pass filter 6g has its output 125 coupled to one input terminal of a second subtractor 9c through a horizontal direction low pass filter 6h and a third absolute value circuit 10c. The respective outputs from the horizontal direction band-pass filter 6h and the third absolute value circuit 10c are identified by 126 and 127. The first horizontal direction band-pass filter 6i has its output 131 coupled to both another input terminal of the second subtractor 9c and one input terminal of a fourth comparator 11d through a second compensating delay circuit 5h, which acts to compensate for a delay occurring in an output from the first horizontal direction band-pass filter 6i, and a fourth absolute value circuit 10d. The respective outputs from the second delay compensating circuit 5h and the fourth absolute value circuit 10d are identified by 132 and 133. The second subtractor 9c has an output 128 coupled to one input terminal of a third comparator 11c having another input terminal adapted to receive an output 129 (Kdy2 as will be described later) from a third constant generator 12c. The fourth comparator 11d also has another input terminal adapted to receive an output 134 (Kd2 as will be described later) from a fourth constant generator 12d.

In this circuit arrangement, the vertical direction low pass filter 6d may be a digital filter having such a transfer function as expressed below:

$$Fvl(Z)=(\tfrac{1}{4})\cdot(1+Z^{-t})^2$$

and the horizontal direction band-pass filter 6e may be a digital filter having such a transfer function as expressed below:

$$Fhh(Z) = 1 - Z^{-4}$$

The horizontal direction band-pass filter 6e is chosen so as to extract a frequency component equal to half the frequency of the color subcarrier in the horizontal direction.

On the other hand, the horizontal direction band-pass filter 6i may be a digital filter having a such a transfer function as expressed below;

$$Fdh(Z) = 1 - Z^{-4}$$

and the vertical direction band-pass filter 6g may be a digital filter having such a transfer function as expressed below:

$$Fvh(Z) = 1 - Z^{-2L}$$

The vertical direction band-pass filter 6g is chosen so as to extract a frequency component equal to half the frequency of the color subcarrier in the vertical direction.

The horizontal direction low pass filter 6h may be a digital filter having such a transfer function as expressed below:

$$Fhu(z) = (\tfrac{1}{4})(1 + Z^{-2})^2$$

and the vertical direction band-pass filter 6f may be a digital filter having such a transfer function as expressed below:

$$Fdv(Z) = 1 - Z^{-2L}$$

Referring still to FIG. 4, the first and second comparators 11a and 11b provide their respective outputs 119 and 124 to different input terminals of a vertical direction correlation detector 13a, whereas the third and fourth comparators 11c and 11d provide their respective outputs 130 and 135 to different input terminals of a horizontal direction correlation detector 13b. The vertical and horizontal direction correlation detectors 13a and 13b feed their respective outputs 136 and 137 to associated input terminals of a determining circuit 14 which in turn provides its output 110 to the switching circuit 8 shown in FIG. 3.

Figure 5:
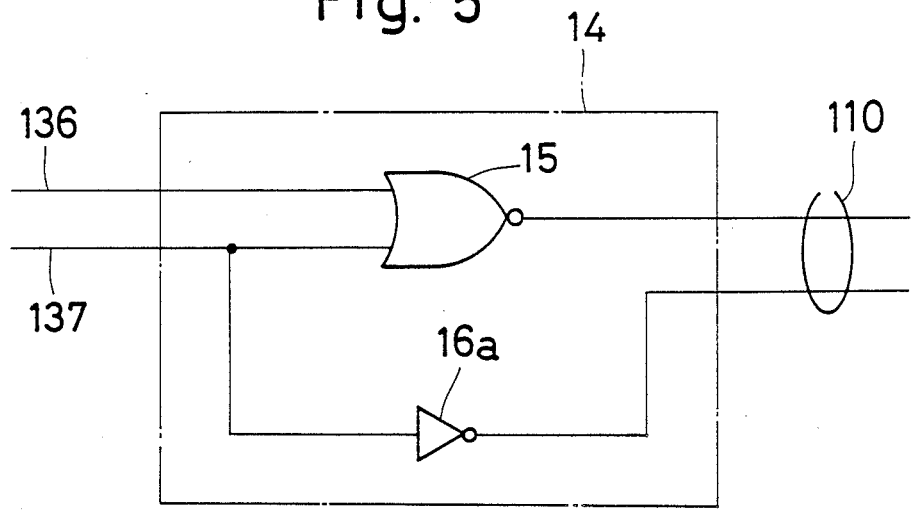
FIG. 5 is a circuit block diagram showing the details of a determining circuit shown in FIG. 4.
Figure 6:
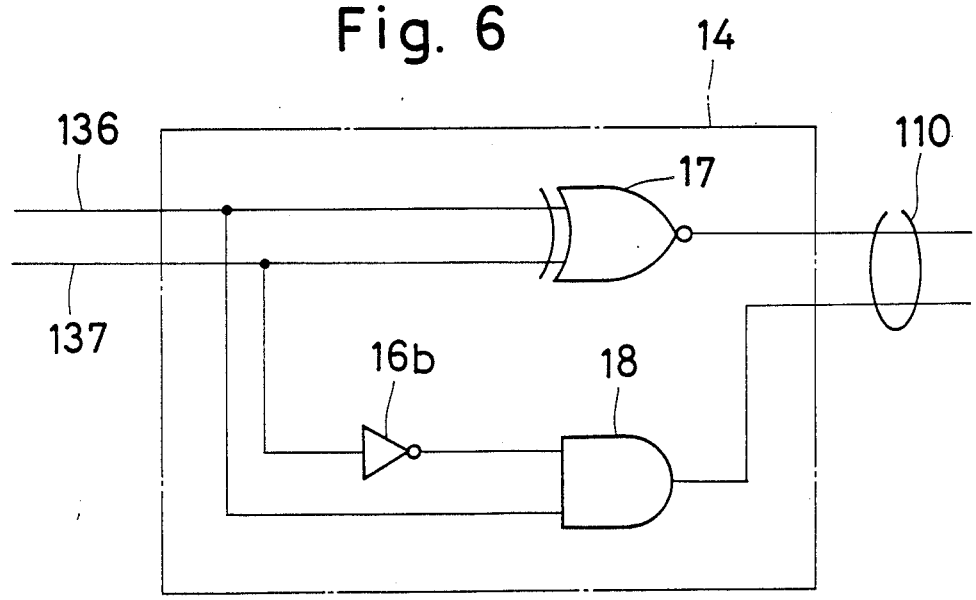
FIG. 6 is a circuit block diagram showing a first embodiment of the determining circuit which can be used in the picture correlation determining device of FIG. 4.

Different embodiments of the determining circuit 14 which can be used in connection with the circuit components shown in FIG. 4 are shown in FIGS. 5 and 6, respectively.

Referring first to FIG. 5, the determining circuit 14 comprises an NOR gate 15 having first and second input terminals connected respectively to the vertical and horizontal direction correlation detectors 13a and 13b shown in FIG. 4, and a NOT gate 16a having an input terminal coupled to the horizontal direction correlation detector 13b. A combination of the outputs from the NOR and NOT gates 15 and 16a represents the output 110 from the determining means 7 of FIG. 4.

In the example shown in FIG. 6, the determining circuit 14 comprises an exclusive NOR gate 17 having first and second input terminals connected respectively to the vertical and horizontal direction correlation detectors 13a and 13b, and an AND gate 18 having first and second input terminals. The first input terminal of the AND gate 18 is connected directly with the vertical direction correlation detector 13a whereas the second input terminal of the AND gate 18 is connected with the horizontal direction correlation detector 13b through a NOT gate 16b. A combination of the outputs from the exclusive NOR gate 17 and the AND gate 18 represents the output 110 from the determining means 7 of FIG. 4.

The filtering circuit described above operates in the following manner.

In FIG. 3, the composite color television signal 101 which has been sampled at the sampling frequency of fs=4·fsc by the A/D converter 4 according to the NTSC scheme is supplied through the one-line delay circuits 5a and 5b so that, when viewed on the screen of the cathode ray tube, the sampling values for the respective three sampling points lie on a common vertical line can be obtained simultaneously. In other words, at the time the composite color television signal (sampling value) S(m, n) for the point of coordinates (m, n) appears on the signal line 102, a signal S(m, n−1) appears on the signal line 103 and a signal S(m, n+1) appears on the signal line 101 as shown in FIG. 2. Based on these sampling values, the filtering circuit for separating both of the luminance signal and the chrominance signal from the composite color television signal is constructed.

In the system, according to the present invention, the vertical direction chrominance signal separator 6a, the horizontal direction chrominance signal separator 6b and the horizontal and vertical direction chrominance signal separator 6c have the following respective transfer functions so that the chrominance signal can be separated by filtering the composite color television signal through these separators.

Vertical direction chrominance separator:

$$Cv(Z) = (-\tfrac{1}{2})(1 - Z^{-L})^2$$

Horizontal direction chrominance separator:

$$Ch(Z) = (-\tfrac{1}{2})(1 - Z^{-2})^2$$

Horizontal and vertical direction chrominance separator:

$$Chv(Z) = [(-\tfrac{1}{2})(1 - Z^{-2})^2] \cdot [(-\tfrac{1}{2})(1 - Z^{-L})^2]$$

The outputs, outputted from the vertical direction chrominance separator 6a, the horizontal direction chrominance separator 6b and the horizontal and vertical direction chrominance separator 6c, are respectively supplied through the associated compensating delay circuits 5c, 5d and 5e to the switching circuit 8 which is designed and controlled by the output from the picture correlation determining circuit 7 so as to select one of the chrominance signals emerging from the respective separators 6a, 6b and 6c in a manner which will now be described.

When the detection of the correlation of the picture in the vertical and horizontal directions with the sampling point of interest indicates that the correlation of the picture in the vertical direction is dominant, the switching circuit 8 selects and outputs the signal 105, that is, the chrominance signal outputted from the separator 6a and subsequently delayed by the delay circuit 5c. When the detection indicates that the correlation of the picture in the horizontal direction is dominant, the switching circuit 8 selects and outputs the signal 107, that is, the chrominance signal outputted from the separator 6b and subsequently delayed by the delay circuit 5d. When the detection indicates a condition other than those mentioned above, the switching circuit 8 selects and outputs the signal 109, that is, the chrominance signal outputted from the separator 6c and subsequently delayed by the delay circuit 5e.

The picture correlation determining circuit 7 which controls the switching circuit 8 as described above operates in the following manner.

Assuming that the non-correlated energy in the vertical direction and the non-correlated energy in the horizontal direction are expressed by Dv(Z) and Dh(Z), respectively, they will be expressed as follows with the use of transfer functions by the introduction of approximated absolute values:

$$Dv(Z) = |1 - Z^{-2t}|$$

$$Dh(Z) = |1 - Z^{-4}|$$

The above equations represent respective filtering characteristics necessary to block both of a direct current component and a frequency component of the color subcarrier in the vertical direction and the horizontal direction. In these equations, Dv(Z) can be obtained from the vertical direction band-pass filter 6f, the compensating delay circuit 5g and the absolute value circuit 10b, whereas Dh(Z) can be obtained from the horizontal direction band-pass filter 6i, the compensating delay circuit 5h and the absolute value circuit 10d.

Also, Assuming that the energy of the high frequency luminance signal in the horizontal direction and the energy of the high frequency luminance signal in the vertical direction are expressed by DYh(Z) and DYv(Z), respectively, they will be expressed as follows with the use of transfer functions by the introduction of approximated absolute values:

$$DYh(Z) = |(\tfrac{1}{4}) \cdot (1 + Z^{-1})^2 \cdot (1 - Z^{-4})|$$

$$DYv(Z) = |(\tfrac{1}{4}) \cdot (1 + Z^{-2})^2 \cdot (1 - Z^{-2t})|$$

It is to be noted that DYh(Z) can be obtained from the vertical direction low-pass filter 6d, the horizontal band-pass filter 6e and the absolute value circuit 10a, whereas DYv(Z) can be obtained from the vertical direction band-pass filter 6g, the horizontal direction low-pass filter 6h and the absolute value circuit 10c.

When the vertical direction correlation detector 13a in FIG. 4 determines that there is a correlation in the vertical direction, the detector 13a provides a logical signal "1" to the determining circuit 14. The correlation following is established by the following relationships.

$$Dv(Z) \leq Kd1, \text{ and}$$

$$DYh(Z) - Dv(Z) \geq Kdy1$$

(wherein Kd1 represents the correlation threshold constant and Kdy1 represents a threshold constant of the high frequency signal energy.)

When either of the following relationship are established, the vertical direction correlation detector 13a determines that there is no correlation in the vertical direction, and therefore, provides a logical signal "0" to the determining circuit 14.

$$Dv(Z) > Kd1, \text{ or}$$

$$DYh(Z) - Dv(Z) < Kdy1$$

In contrast, the horizontal direction correlation detector 13b determines that there is a correlation in the horizontal direction, and therefore, provides a logical signal "1", when the following relationships are satisfied.

$$Dh(Z) \leq Kd2, \text{ and}$$

$$DYv(Z) - Dh(Z) \geq Kdy2$$

(wherein Kd2 represents the correlation threshold constant and Kdy2 represents a threshold constant of the high frequency signal energy.)

However, when either of the following relationship are established, the horizontal direction correlation detector 13b determines that there is no correlation in the horizontal direction and, therefore, provides a logical signal "0" to the determining circuit 14.

$$Dh(Z) > Kd2, \text{ or}$$

$$DYv(Z) - Dh(Z) < Kdy2$$

Dependent upon the result of detection of the correlation made by the vertical and horizontal correlation detectors 13a and 13b as described above, the determining circuit 14 controls the switching circuit 8 in the following manner.

The relationship between the input and output of the determining circuit 14 as shown in FIG. 5 is shown in FIG. 7. When the output from the NOR gate 15 is "1", the switching circuit 8 in FIG. 3 is in position to connect the switch with the signal line 109 so that the output from the horizontal and vertical direction chrominance signal separator 6c can be outputted. However, when the output from the NOR gate 15 is "0", the switch is controlled by the output from the NOT 16a. When the output from the NOT gate 16a is "0" or "1", the output from the horizontal direction chrominance signal separator 6b or the output from the vertical direction chrominance signal separator 6a is outputted therefrom, respectively. In the example shown in FIG. 5, the output C(Z) from the switching circuit 8 varies in the following manner.

If there is the correlation in the horizontal direction, C(Z) = Ch(Z).

However, if there is no correlation in the horizontal direction,

C(Z) = Cv(Z) if there is the correlation in the vertical direction or

C(Z) = Chv(Z) if there is no correlation in the vertical direction.

On the other hand, in the determining circuit 14 as shown in FIG. 6, the relationship between the input and the output is shown in FIG. 8. The output from the exclusive NOR gate 17 is, as is the same as the output from the NOR gate 15 shown in FIG. 5, utilized in the switching circuit 8 in FIG. 3 to switch on and off the output from the horizontal and vertical chrominance signal separator 6c, whereas the output from the AND gate 18 in FIG. 6 is, as is the same as the output from the NOT gate 16a shown in FIG. 5, utilized to select one of the outputs from the respective horizontal and vertical direction chrominance separators 6b and 6a in FIG. 3. Accordingly, in the determining circuit as shown in FIG. 6, the output C(Z) from the switching circuit 8 varies in the following manner.

If there is the correlation in the horizontal direction, but not in the vertical direction, $$C(Z) = C_h(Z).$$

If there is the correlation in the vertical direction, but not in the horizontal direction, $$C(Z) = C_v(Z).$$

If there is the correlation in both of the horizontal and vertical directions, or no correlation in both of them, $$C(Z) = C_{hv}(Z).$$

The chrominance signal 111 outputted from the switching circuit 8 in FIG. 3 is subtracted in the subtracting circuit 9a from the composite video signal, included in the output 112 from the compensating delay circuit 5f, to give the luminance signal 113.

According to a second preferred embodiment of the picture correlation determining means, the picture correlation determining means have a circuit arrangement identical with that shown and described with reference to FIG. 4. However, in this second preferred embodiment of the picture correlation determining means 7, the vertical direction low pass filter 6d, the horizontal direction band-pass filter 6e and the absolute value circuit 10a, all shown in FIG. 4, are understood to be constituting means for extracting a frequency component which is low in frequency in the vertical direction at the sampling point of interest and which corresponds to half the frequency of the color subcarrier in the horizontal direction and for detecting the energy of the high frequency luminance signal for the horizontal direction by the determination of its absolute value. Similarly, the vertical direction band-pass filter 6f, the compensating delay circuit 5g and the absolute value circuit 10b, all shown in FIG. 4, are understood to be constituting means for removing both a direct current component in the vertical direction at the sampling point of interest and a frequency component corresponding to a component of the color subcarrier and for detecting a non-correlated energy in the vertical direction by its determination of the absolute value. The vertical direction band-pass filter 6g, the horizontal direction low pass filter 6h and the absolute value circuit 10c, similarly shown in FIG. 4, are understood to be constituting means for extracting a frequency component which is low in frequency in the horizontal direction at the sampling point of interest and which corresponds to half the frequency of the color subcarrier in the vertical direction and for detecting the energy of the high frequency luminance signal for the vertical direction by the determination of its absolute value. The horizontal band-pass filter 6i, the compensating delay circuit 5h and the absolute value circuit 10d, also shown in FIG. 4, are understood to be constituting means for removing both a direct current component in the horizontal direction at the sampling point of interest and a frequency component corresponding to a component of the color subcarrier and for detecting a non-correlated energy in the horizontal direction by the determination of its absolute value.

Where the picture correlation determining means 7 according to such second preferred embodiment is employed, the determining circuit 14 shown in FIG. 4 has to be modified as shown in either FIGS. 9 or 10, which illustrate third and fourth embodiments of the determining circuit 14, respectively, reference to which will now be made.

Figure 9:
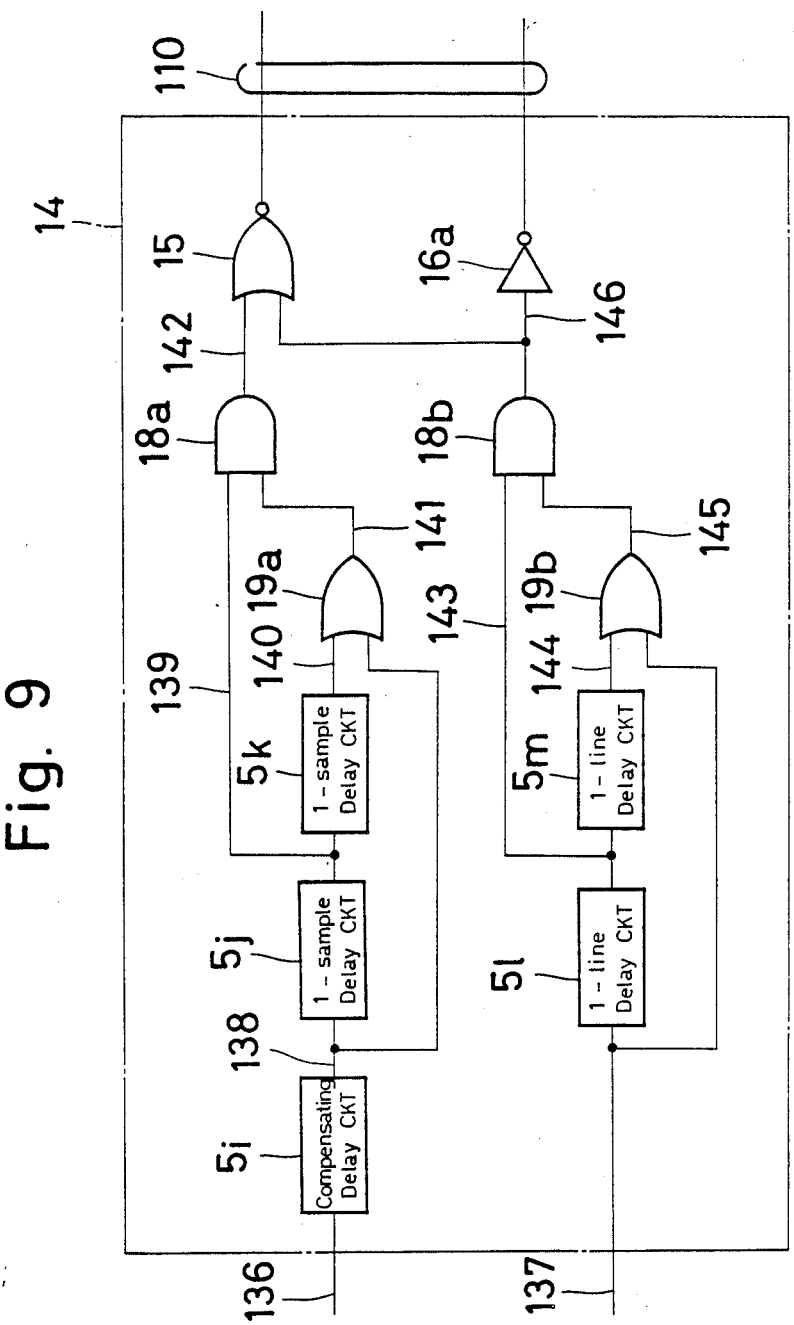
FIGS. 9 to 12 are circuit block diagrams showing second, third, fourth and fifth embodiments of the determining circuit which can be used in the picture correlation determining means of FIG. 4.

Referring first to FIG. 9, the output 136 from the vertical direction correlation detector 13a is sequentially applied to a one-sample delay circuit 5j and to a one-sample delay circuit 5k through a compensating delay circuit 5i. An output 138 emerging from the compensating delay circuit 5i is also applied to one input terminal connected of an OR gate 19a having the other input terminal to which an output 140 from the one-sample delay circuit 5k. Both an output 139 from the one-sample delay circuit 5j and an output 141 from the OR gate 19a are supplied to respective input terminals of an AND gate 18a. An output 142 from the AND gate 18b is in turn connected to one input terminal of a NOR gate 15.

The output 137 from the horizontal correlation detector 13b is sequentially applied through a one-line delay circuit 5l and rear one-line delay circuit 5m as an output 144 to one input terminal of an OR gate 19b having the other input terminal connected to the output 137 directly. Both of an output 143 from the one-line delay circuit 5l and an output 145 from the OR gate 19b are supplied to respective input terminals of an AND gate 18b.

An output of the AND gate 18b adapted to receive the output 143 from the one-line delay circuit 5l and the output 145 from the OR gate 19b is coupled to another input terminal of the NOR gate 15 and also to a NOT gate 16a. A combination of the respective outputs from the NOR gate 15 and the NOT gate 16a together constitute the output 110 of the picture correlation determining means 7.

Figure 10:
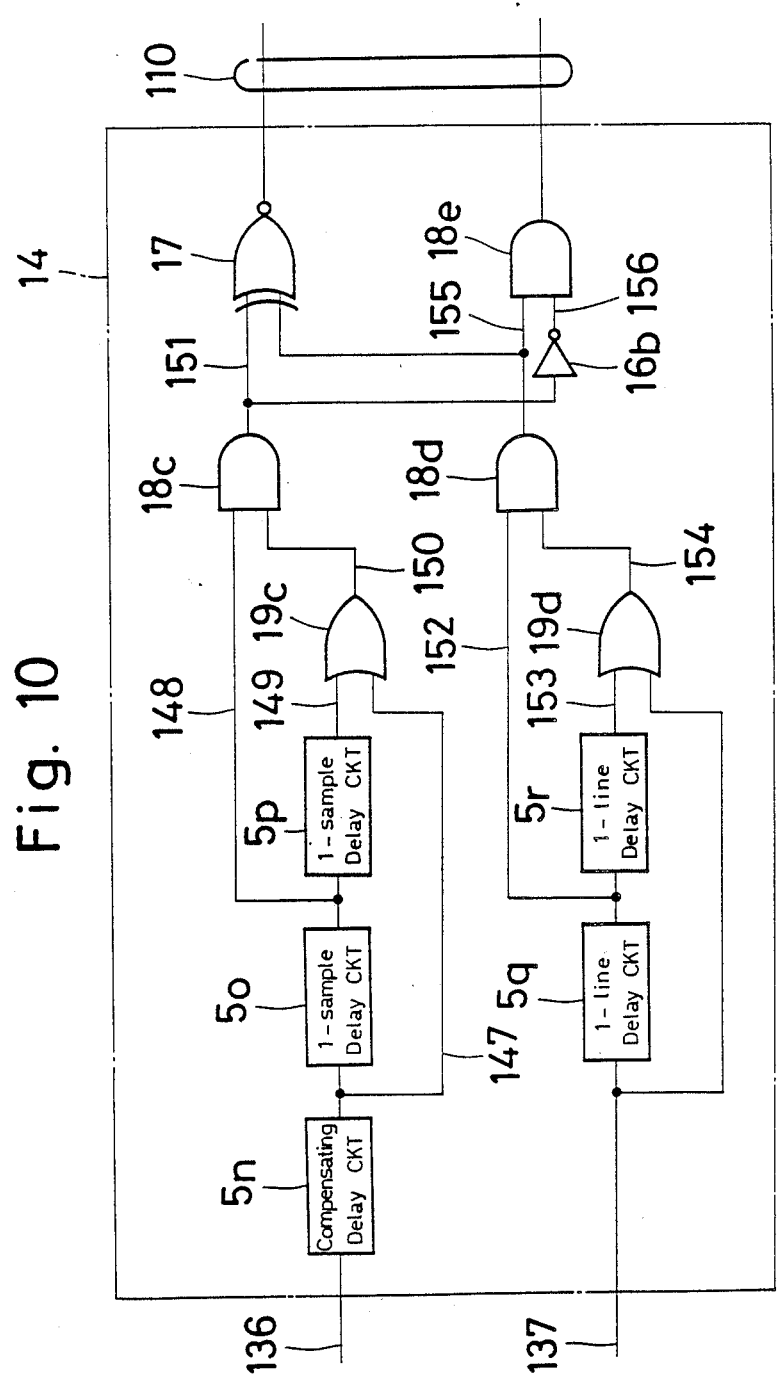

In the fourth embodiment of the determining circuit 14 shown in FIG. 10, the output 136 from the vertical direction correlation detector 13a is sequentially supplied to a one-sample delay circuit 5o and to a one-sample delay circuit 5p through a compensating delay circuit 5n. An output 147 emerging from the compensating delay circuit 5n is also supplied to one input terminal of an OR gate 19c having the other input terminal connected to an output 149 from the one-sample delay circuit 5p. Both an output 148 from the one-sample delay circuit 5o and an output 150 from the OR gate 19c are supplied to respective input terminals of an AND gate 18c. An output 151 from the AND gate 18c is in turn connected to one input terminal of an exclusive NOR gate 17.

The output 137 from the horizontal correlation detector 13b is sequentially supplied through a one-line delay circuit 5q and a one-line delay circuit 5r as an output 153 to one input terminal of an OR gate 19d having the other input terminal connected to the the output 137 directly. Both an output 152 from the front one-line delay circuit 5q and an output 154 from the OR gate 19d are supplied to respective input terminals of an AND gate 18d.

An output of the AND gate 18d adapted to receive the output 152 from the one-line delay circuit 5q and the output 154 from the OR gate 19d is coupled to another input terminal of the exclusive NOR gate 17 and also to one input terminal of an AND gate 18e having the other input terminal connected to the output of the AND gate 18c through a NOT gate 16b. An output from the NOT gate 16b is identified by 156. A combination of the respective outputs from the exclusive NOR gate 17 and the AND gate 18e together constitute the output 110 of the picture correlation determining means 7.

Dependent upon the result of detection of the correlation made by the vertical and horizontal correlation detectors 13a and 13b in FIG. 4, the determining circuit 14 of FIG. 9 controls the switching circuit 8 in the following manner.

When the determining circuit 14 used in the picture correlation determining means 7 of the third embodiment is as shown in FIG. 9, each of the outputs from the delay circuits 5i, 5j and 5k represents respective results of detection of the correlation at the three sampling points in the horizontal direction on the screen. If one of the results of detection of the correlation in the horizontal direction at two reference sampling points positioned on left-hand and right-hand sides, respectively, of the sampling point of interest indicates that there is a correlation, the output 141 from the OR gate 19a will be "1" and the output 141 indicative of the result of detection of the correlation in the horizontal direction is outputted as the output 142 from the AND gate 18a. However, if there is no correlation at any reference sampling point, the output 141 from the OR gate 19a will be "0", and, irrespective of the result of detection of the correlation in the horizontal direction, the output 142 from the AND gate 18a will be "0" indicating that there is no correlation. Accordingly, the output from the AND gate 18a represents the result of detection of the correlation in the horizontal direction at the sampling point of interest from which an isolating point in the horizontal direction has been removed.

Since the result of the detection of the correlation in the vertical direction at the three sampling points lying in the vertical direction on the screen is represented by inputs and outputs of the one-line delay circuits 5l and 5m, the output from the AND gate 18b represents, by the same reasoning given above, the result of detection of the correlation in the vertical direction at the sampling point of interest from which an isolating point in the horizontal direction has been removed.

In response to the outputs indicative of the results of detection of the correlations in the horizontal and vertical directions, respectively, from which the associated isolating points have been removed, the NOR gate 15 outputs a logical signal "1" only when there is no correlation in both of the horizontal and vertical directions. The output from the NOR gate 15 is utilized to control the switching circuit 8 in such a manner that, when the output from the NOR gate 15 is "1" the switching circuit 8 in FIG. 3 is held in position to select the output 109 from the horizontal and vertical direction chrominance signal separator 6c. However, when the output from the NOR gate 15 is "0", the switching circuit 8 is held in position to select the output 107 from the horizontal direction chrominance signal separator 6b or to select the output 105 from the vertical direction chrominance signal separator 6a. In the latter case, the outputs 107 and 105 are selected by the switching circuit 8 according to the output from the NOT gate 16a. Specifically, when the output from the NOT gate 16a is "0" or "1", the output 107 from the horizontal direction chrominance signal separator 6b or the output 105 from the vertical direction chrominance signal separator 6a is selected, respectively. In view of the fact that the signal indicative of the result of detection of the correlation in the horizontal direction from which the isolating point has been removed is applied to the NOT gate 16a, the switch in the switching circuit 8 can be switched over dependent upon the presence or absence of the correlation in the horizontal direction.

From the foregoing, in the filtering circuit utilizing the determining circuit 14 of FIG. 9, the characteristic C(Z) of the chrominance signal separating filter varies in the following manner dependent upon on the presence or absence of the correlation.

If there is the correlation in the horizontal direction, $$C(Z) = Ch(Z).$$

When there is no correlation in the horizontal direction,
$C(Z) = Cv(Z)$ if there is the correlation in the vertical direction or
$C(Z) = Chv(Z)$ if there is no correlation in the vertical direction, wherein Cv(Z), Ch(Z) and Chv(Z), as mentioned above, represent the transfer functions of the chrominance signal separators 6a, 6b and 6c of FIG. 3, respectively.

The operation of the determining circuit 14, shown and described with reference to FIG. 10, for removing the isolating point is substantially similar to that described connection with the determining circuit 14 shown in and described with reference to FIG. 9, and therefore, for the sake of brevity, only the control operation performed by the switching circuit 8 resulting from the results of detection of the correlations in the horizontal and vertical directions subsequent to the removal of the isolating point will be described.

In response to the outputs indicative of the results of detection of the correlations in the horizontal and vertical directions, respectively, from which the associated isolating points have been removed, the exclusive NOR gate 17 outputs a logical signal "1" either when there is the correlation in both the horizontal and vertical directions or when there is no correlation in both the horizontal and vertical directions. The output from the exclusive NOR gate 17 is utilized to control the switching circuit 8 in such a manner that, when the output from the exclusive NOR gate 17 is "1" as described above, the switching circuit 8 is held in position to pass therethrough the output 109 from the horizontal and vertical direction chrominance signal separator 6c. However, when the output from the exclusive NOR gate 17 is "0", the switching circuit 8 is held in position to select the output 107 from the horizontal direction chrominance signal separator 6b or to select the output 105 from the vertical direction chrominance signal separator 6a.

The switching circuit 8 is operable so that when the output from the exclusive NOR gate 17 is "0", the horizontal direction chrominance signal separator 6b can be selected, but when it is "1", the vertical direction chrominance signal separator 6a can be selected.

Accordingly, in the filtering circuit utilizing the determining circuit 14 of FIG. 10, the characteristic C(Z) of the chrominance signal separating filter varies in the following manner in dependence on the presence or absence of the correlation.

If there is the correlation in the horizontal direction, but not in the vertical direction, $$C(Z) = Ch(Z)$$

if there is the correlation in the vertical direction, but not in the horizontal direction, $$C(Z) = Cv(Z)$$

and if there is the correlation in both of the vertical and horizontal directions, or no correlation in both of them, $$C(Z) = Ch\pi(Z).$$

The chrominance signal outputted from the switching circuit 8 is substracted in the subtracting circuit 9a from the composite video signal, included in the output 112 from the compensating delay circuit 5f, to give the luminance signal 113.

Figure 11:
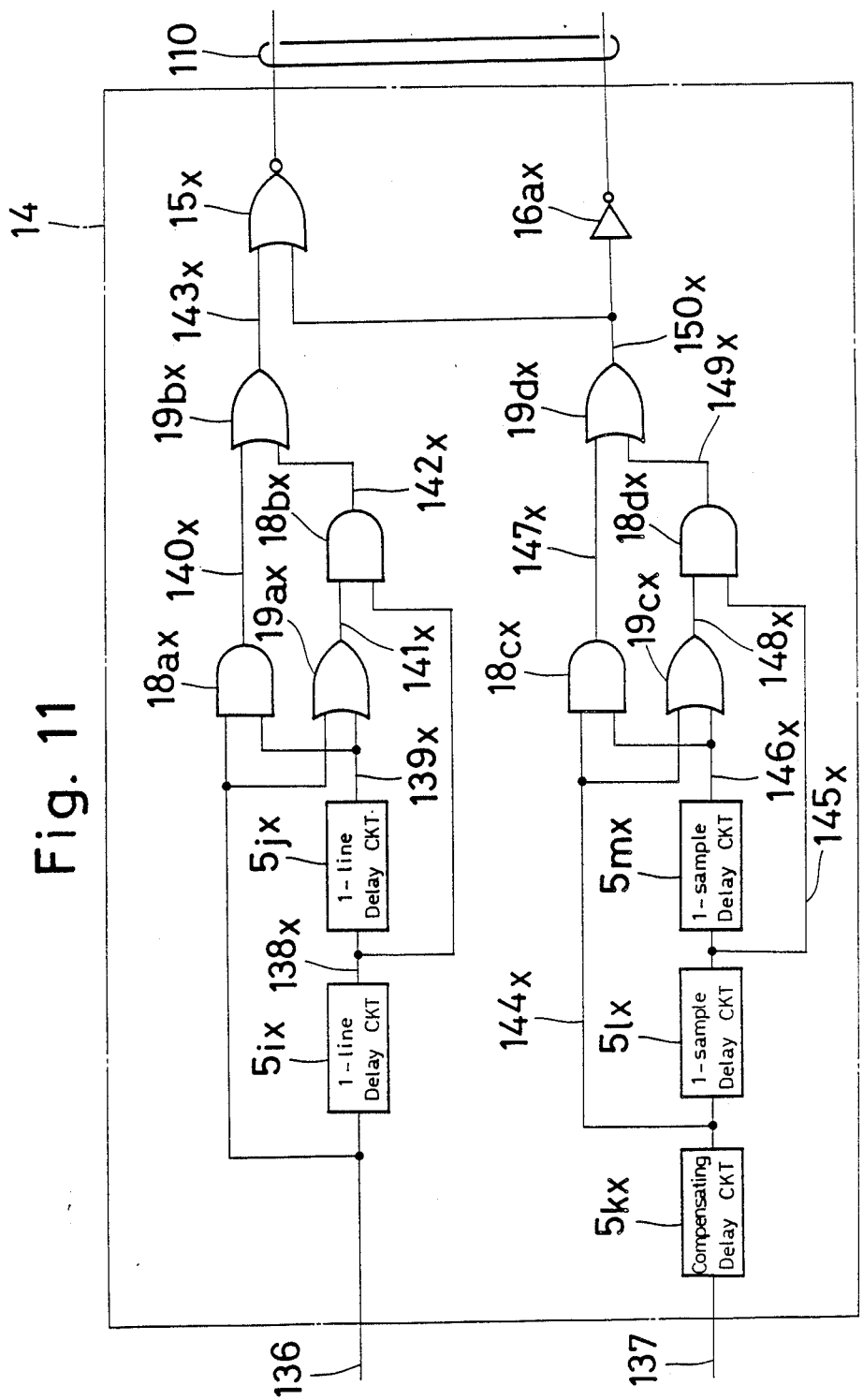
Figure 12:
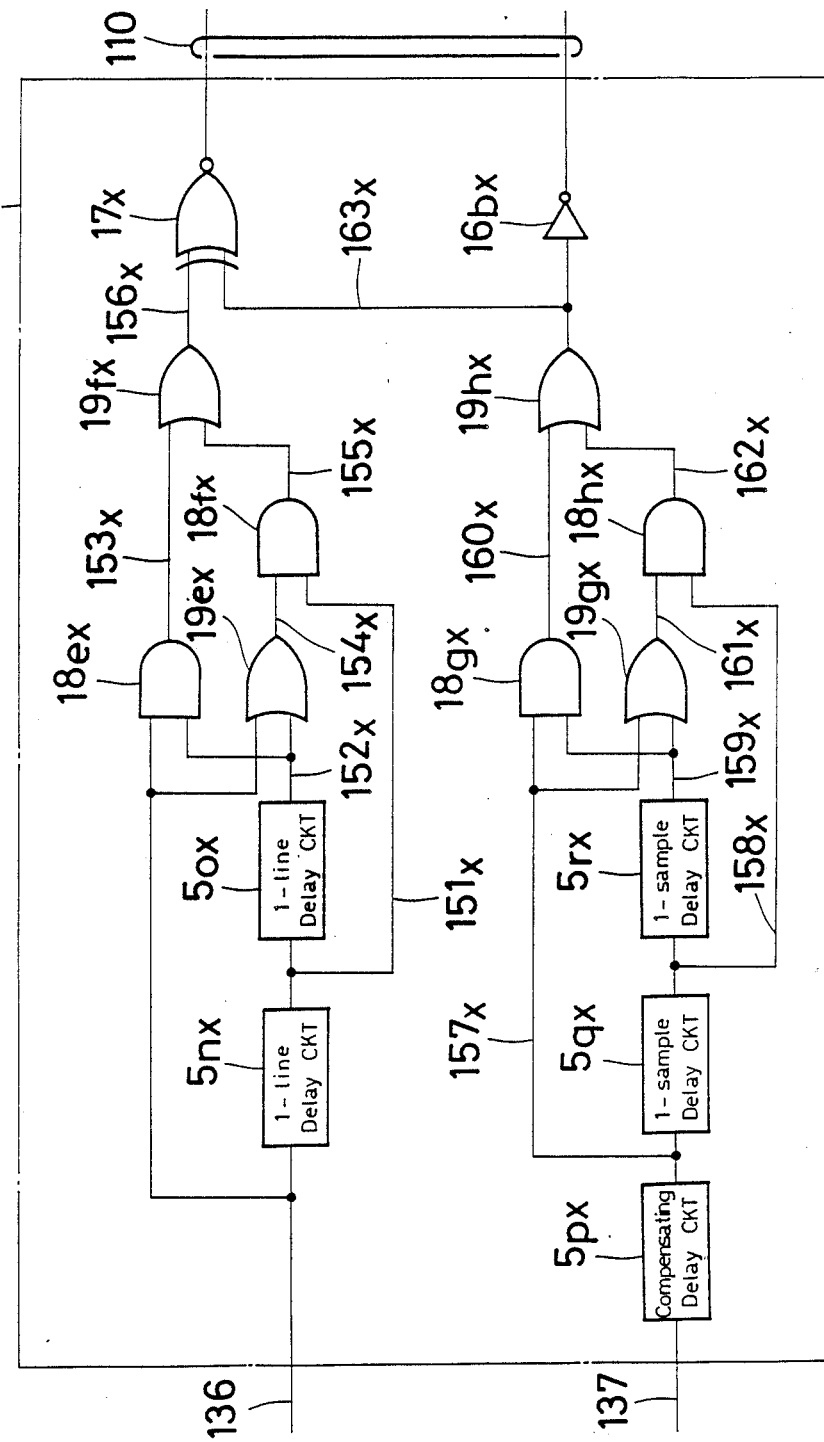

The determining circuit 14 included in the picture correlation determining means 7 used in the filtering circuitry described above in connection with FIGS. 9 and 10 may be modified as shown in either FIGS. 11 or 12 which illustrate respective fifth and sixth embodiments of the determining circuit 14.

Referring to FIG. 11, the output 136 from the vertical direction correlation detector 13a is sequentially supplied to a one-line delay circuit 5ix and to a rear one-line delay circuit 5jx to provide simultaneously results of detection of correlation of the sampling points lying in the vertical direction on the screen. The output 136 is also supplied to respective input terminals of an AND gate 18ax and an OR gate 19ax having their respective other input terminals connected to an output 139x from the one-line delay circuit 5jx. An AND gate 18bx having its input terminals adapted to receive an output 141x from the OR gate 19a and an output 138x from the one-line delay circuit 5ix has an output 142x coupled to one input terminal of an OR gate 19bx having the other input terminal adapted to receive an output 140x from the AND gate 18ax. An output 143x from the OR gate 19bx is coupled to one input terminal of a NOR gate 15x.

The output 137 from the horizontal correlation detector 13b is sequentially supplied through a compensating delay circuit 5kx to a one-sample delay circuit 5lx and to a one-sample delay circuit 5mx to provide simultaneously results of detection of correlation of the sampling points lying in the horizontal direction on the screen. An output 144x from the compensating delay circuit 5kx is also supplied to respective input terminals of an AND gate 18cx and an OR gate 19cx, and an output 146x from the one-sample delay circuit 5mx is supplied to the respective other input terminals of the AND gate 18cx and the OR gate 19cx. An AND gate 18dx having its input terminals adapted to receive an output 148x from the AND gate 19cx and also an output 145x from the front one-sample delay circuit 5lx has an output 149x coupled to one input terminal of an OR gate 19dx having the other input terminal adapted to receive an output 147x from the AND gate 18cx. The OR gate 19dx has its output 150x coupled to another input terminal of the NOR gate 15x and also to an NOT gate 16ax. A combination of the respective outputs from the NOR gate 15x and the NOT gate 16ax together constitute the output 110 from the image correlation determining means 7.

In the embodiment of the determining circuit 14 shown in FIG. 12, the output 136 from the vertical direction correlation detector 13a is sequentially supplied to a one-line delay circuit 5nx and to a one-line delay circuit 5ox to provide simultaneously results of detection of correlation of the sampling points lying in the vertical direction on the screen. The output 136 is also supplied to respective one input terminals of an AND gate 18ex and an OR gate 19ex having respective other input terminals to which an output 152x from the one-line delay circuit 5ox is applied. An AND gate 18fx having its input terminals adapted to receive an output 154x from the OR gate 19ex and an output 151x from the one-line delay circuit 5nx has an output 155x coupled to one input terminal of an OR gate 19fx which has the other input terminal adapted to receive an output 153x from the AND gate 18ex. An output 156x from the OR gate 19fx is coupled to one input terminal of an exclusive NOR gate 17x.

The output 137 from the horizontal correlation detector 13b is sequentially supplied through a compensating delay circuit 5px to a one-sample delay circuit 5qx and to a one-sample delay circuit 5rx to provide simultaneously results of detection of correlation of the sampling points lying in the horizontal direction on the screen. An output 157x from the compensating delay circuit 5px is also supplied to the respective input terminals of an AND gate 19gx. An OR gate 19gx, and an output 159x from the rear one-sample delay circuit 5rx is supplied to the respective other input terminals of the AND gate 18gx and the OR gate 19gx. An AND gate 18hx having its input terminals adapted to receive an output 161x from the OR gate 19gx and an output 158x from the one-sample delay circuit 5qx has its output 162x coupled to an OR gate 19hx which has the other input terminal adapted to receive an output 160x from the AND gate 18gx. The OR gate 19hx has its output 163x coupled to the other input terminal of the exclusive NOR gate 17x and also to an NOT gate 16bx. A combination of the respective outputs from the exclusive NOR gate 17x and the NOT gate 16bx together constitute the output 110 from the image correlation determining means 7.

It is, however, to be noted that, in FIG. 12, the circuit including the delay circuits 5nx to 5rx, the OR gates 19ex to 19hx and AND gates 18ex to 18hx is substantially identical to the circuit shown in FIG. 11 and including the delay circuits 5ix to 5mx, the OR gates 19ax to 19dx and the AND gates 18ax to 18dx.

While the filtering circuit operates in a manner identical with that described above in connection with FIGS. 9 and 10 the determining circuit 14 of the construction shown in and described with reference to either FIGS. 11 or 12 operates in the following manner to control the switching circuit 8.

When the determining circuit 14 used in the picture correlation determining means 7 of the fifth embodiment is as shown in FIG. 11, each of the outputs from the delay circuits 5i and 5j represent respective results of detection of the correlation at the three sampling points in the vertical direction on the screen. Let it be assumed that the sampling point at the center is referred to as the sampling point of interest and two sampling points positioned above and below the sampling point of interest are referred to as reference sampling points. If the result of detection of the correlation in the vertical direction at any one of the reference sampling points indicates that there is no correlation, the respective outputs 140x and 141x from the AND gate 18ax and the OR gate 19ax are "0", and the output 143x of the OR gate 19bx will be "0" (indicating that there is no correlation) regardless of the result of detection of the correlation in the vertical direction at the sampling point of interest.

Conversely, if the result of detection of the correlation in the vertical direction at any one of the reference sampling points indicates that there is a correlation, the output 140x of the AND gate 18ax will be "1", and the output 143x from the OR gate 19bx will be "1" (indicating that there is the correlation) regardless of the result of detection of the correlation in the vertical direction at the sampling point of interest. When the results of detection of the correlation at one of the reference sampling points indicates that there is a correlation, but the result of detection of the correlation at the other the reference sampling points indicates that there is no correlation, the outputs 140x and 141x from the AND gate 18ax and the OR gate 19ax will be "0" and "1", respectively, causing the signal indicative of the result of detection of the correlation in the vertical direction at the sampling point of interest to be outputted as the output 143x from the OR gate 19bx. Accordingly, the output from the OR gate 19bx represents the result of detection of the correlation in the vertical direction at the sampling point of interest from which an isolating point in the vertical direction has been removed.

Since the result of detection of the correlation in the horizontal direction at the three sampling points lying in the horizontal direction on the screen is represented by inputs and outputs of the one-sample delay circuits 51x and 5mx, the output 150x from the OR gate 19dx represents the result of detection of the correlation in the horizontal direction at the sampling point of interest from which an isolating point in the horizontal direction has been removed.

In response to the outputs indicative of the results of detection of the correlations in the horizontal and vertical directions, respectively, from which the associated isolating points have been removed, the NOR gate 15x outputs a logical signal "1" only when there is no correlation in both the horizontal and vertical directions. The output from the NOR gate 15x is utilized to control the switching circuit 8 in FIG. 3 in a manner such that, when the output from the NOR gate 15x is "1" as described above, the switching circuit 8 is held in position to select the output 109 from the horizontal and vertical direction chrominance signal separator 6c. However, when the output from the NOR gate 15x is "0", the switching circuit 8 is held in position to select the output 107 from the horizontal direction chrominance signal separator 6b or to select the output 105 from the vertical direction chrominance signal separator 62. In the latter case, the outputs 107 and 105 are selected by the switching circuit 8 according to the output from the NOT gate 16ax. Specifically, when the output from the NOT gate 16ax is "0" or "1", the output 107 from the horizontal direction chrominance signal separator 6b or the output 105 from the vertical direction chrominance signal separator 6a is selected, respectively. In view of the fact that the signal indicative of the result of detection of the correlation in the horizontal direction from which the isolating point has been removed is applied to the NOT gate 16ax, the switch in the switching circuit 8 can be switched over dependent upon the presence or absence of the correlation in the horizontal direction.

From the foregoing, in the filtering circuit utilizing the determining circuit 14 of FIG. 11, the characteristic C(Z) of the chrominance signal separating filter varies in the following manner dependent upon the presence or absence of the correlation.

If there is a correlation in the horizontal direction, $$C(Z) = Ch(Z),$$

when there is no correlation in the horizontal direction, $C(Z) = Cv(Z)$ if there is a correlation in the vertical direction or $C(Z) = Chv(Z)$ if there is no correlation in the vertical direction.

The operation of the determining circuit 14, shown and described with reference to FIG. 12, for removing the isolating point is substantially similar to that described connection with the determining circuit 14 shown in and described with reference to FIG. 11 and therefore, for the sake of brevity, only the control operation performed by the switching circuit 8 resulting from the results of detection of the correlations in the horizontal and vertical directions subsequent to the removal of the isolating point will be described.

In response to the outputs indicative of the results of detection of the correlations in the horizontal and vertical directions, respectively, from which the associated isolating points have been removed, the exclusive NOR gate 17x outputs a logical signal "1" either when there is a correlation in both the horizontal and vertical directions or when there is no correlation in both the horizontal and vertical directions. The output from the exclusive NOR gate 17x is utilized to control the switching circuit 8 in a manner such that when the output from the exclusive NOR gate 17x is "1", the switching circuit 8 is held in position to select the output 109 from the horizontal and vertical direction chrominance signal separator 6c. However, when the output from the exclusive NOR gate 17x is "0", the switching circuit 8 is held in position to select the output 107 from the horizontal direction chrominance signal separator 6b or to select the output 105 from the vertical direction chrominance signal separator 6a.

The switching circuit 8 is operable so that in response to a "0" output from the NOT gate 16bx when the output from the NOR gate 17x is "0" the horizontal direction chrominance signal separator 6b can be selected, but when the output from NOT gate 16hx is "1", the vertical direction chrominance signal separator 6a can be selected.

Accordingly, in the filtering circuit utilizing the determining circuit 14 of FIG. 12, the characteristic C(Z) of the chrominance signal separating filter varies in the following manner dependent upon the presence or absence of the correlation.

If there is a correlation in the horizontal direction, but not in the vertical direction, $$C(Z) = Ch(Z),$$

If there is a correlation in the vertical direction, but not in the horizontal direction, $$C(Z) = Cv(Z),$$

If there is the correlation in both the vertical and horizontal directions, or no correlation in both the vertical and horizontal directions, $$C(Z) = Chv(Z).$$

The chrominance signal outputted from the switching circuit 8 in FIG. 3 is subtracted in the subtracting circuit 9a from the composite video signal, included in the output 112 from the compensating delay circuit 5f, to give the luminance signal 113.

Figure 13:
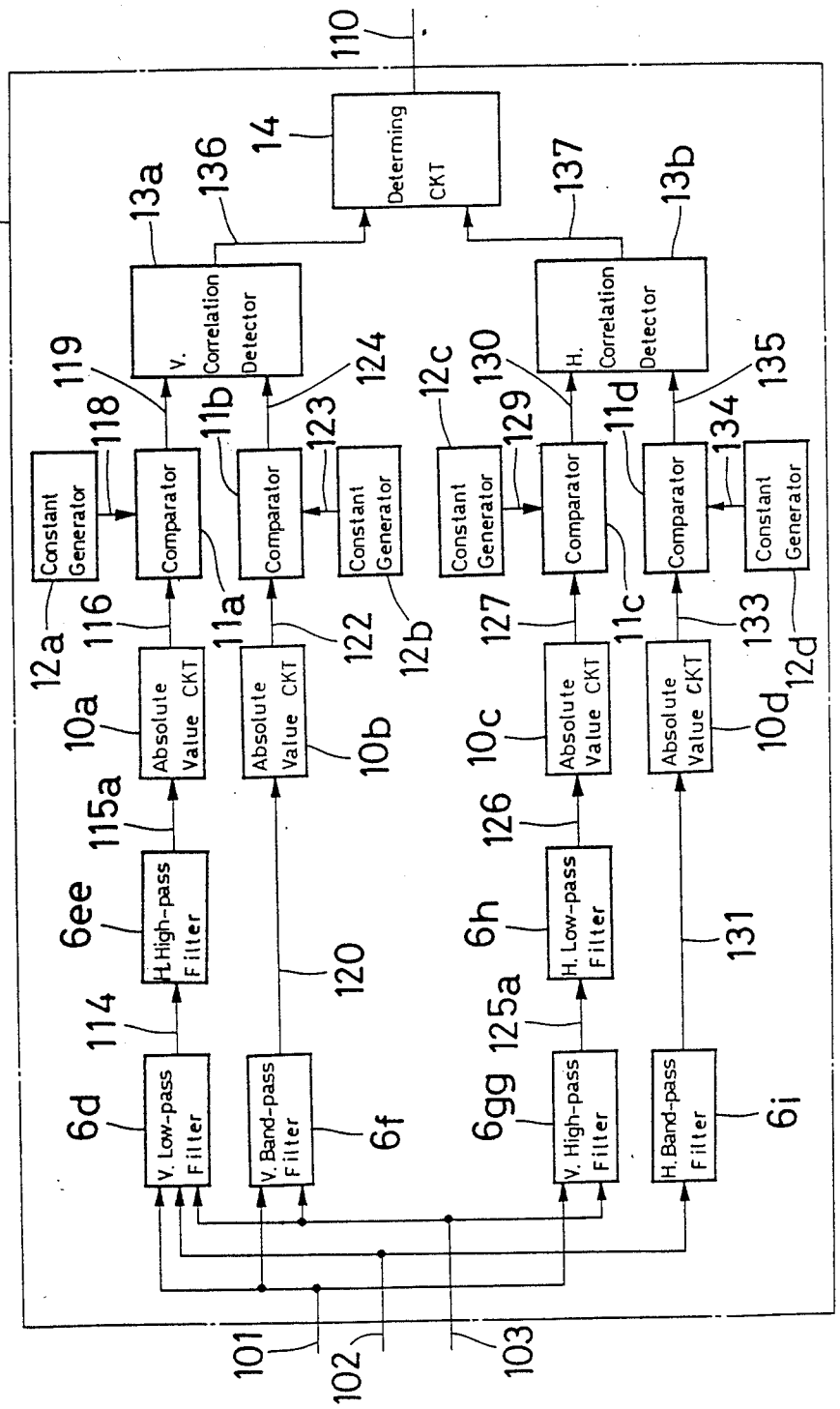
FIG. 13 is a circuit block diagram showing another embodiment of the picture correlation determining device used in the filtering circuit shown in FIG. 3.

The picture correlation determining means utilizing the determining circuit 14 shown and described with reference to FIGS. 5 and 6 (the third and fourth embodiments) may be modified as shown in FIG. 13 which illustrates a seventh embodiment according to the present invention.

The picture correlation determining means 7a shown in FIG. 13 differs from that shown in FIG. 4 in that the circuit arrangement of do not utilize the compensating delay circuits 5g and 5h and the subtracting circuits 9b and 9c of FIG. 4. In other words, according to the circuit arrangement shown in FIG. 13, the output 120 from the vertical direction band-pass filter 6f is coupled to the comparator 11b through the absolute value circuit 10b, and on the other hand, the output 131 from the horizontal band-pass filter 6i is coupled to the comparator 11d through the absolute value circuit 10d.

In addition, the determining means 7a differs from the determining means 7 in that horizontal high-pass filter 6ee and vertical direction high-pass filter 6gg are substituted for the horizontal direction band-pass filter 6e and the vertical direction band-pass filter 6g both shown in FIG. 4.

As is the case with the details of the picture correlation determining means 7 described above, the vertical direction low pass filter 6d, the horizontal direction band-pass filter 6ee and the absolute value circuit 10a are understood to be constituting means for extracting a frequency component which is low in frequency in the vertical direction at the sampling point of interest and which corresponds to half the frequency of the color subcarrier in the horizontal direction and for detecting the energy of the high frequency luminance signal for the horizontal direction by the determination of its absolute value. Similarly, the vertical direction band-pass filter 6f and the absolute value circuit 10b are understood to be constituting means for removing both a direct current component in the vertical direction at the sampling point of interest and a frequency component corresponding to a component of the color subcarrier and for detecting a non-correlated energy in the vertical direction by the determination of its absolute value thereof. The vertical direction band-pass filter 6gg, the horizontal direction low pass filter 6h and the absolute value circuit 10c are understood to be constituting means for extracting a frequency component which is low in frequency in the horizontal direction at the sampling point of interest and which corresponds to half the frequency of the color subcarrier in the vertical direction and for detecting the energy of the high frequency luminance signal for the vertical direction by the determination of its absolute value thereof. The horizontal band-pass filter 6i and the absolute value circuit 10d are understood to be constituting means for removing both a direct current component in the horizontal direction at the sampling point of interest and a frequency component corresponding to a component of the color subcarrier and for detecting a non-correlated energy in the horizontal direction by the determination of its absolute value.

Also, as is the case with the determining means 7 shown in and described with reference to FIG. 4, the outputs 101, 102 and 103 from the respective A/D converter 4, the one-line delay circuit 5a and the one-line delay circuit 5b are supplied to the determining means 7a as shown in FIG. 13. Specifically, the output 101 from the A/D converter 4 is supplied to the vertical direction low pass filter 6d of FIG. 13, the vertical direction band-pass filter 6f and the vertical direction high-pass filter 6gg. The output 102 from the front one-line delay circuit 5a is supplied to the vertical direction low pass filter 6d, the vertical direction band-pass filter 6f, the vertical direction high-pass filter 6gg and the horizontal direction band-pass filter 6i. The output 103 from the one-line delay circuit 5b is supplied to the vertical direction low pass filter 6d, the vertical direction band-pass filter 6f and the vertical direction high-pass filter 6gg.

The vertical direction low pass filter 6d has its output 114 coupled to one input terminal of the comparator 11a through the horizontal direction high-pass filter 6ee and the absolute value circuit 10a. The respective outputs from the horizontal direction high-pass filter 6ee and the absolute value circuit 10a are identified by 115a and 116. The vertical direction band-pass filter 6f has its output 120 coupled to one input terminal of the comparator 11b through the absolute value circuit 10b. The comparator 11a has another input terminal adapted to receive the output 118 (Kdy1 as will be described later) from the constant generator 12a whereas the second comparator 11b has another input terminal adapted to receive the output 123 (Kd1 as will be described later) from the constant generator 12b.

The vertical high-pass filter 6gg has its output 125a coupled to one input terminal of the comparator 11c through the horizontal direction low-pass filter 6h and the absolute value circuit 10c. The horizontal direction band-pass filter 6i has its output 131 coupled to one input terminal of the comparator 11d through the absolute value circuit 10d. The comparator 11c has another input terminal adapted to receive the output 129 (Kdy2 as will be described later) from the constant generator 12c whereas the comparator 11d has another input terminal adapted to receive the output 134 (Kd2 as will be described later) from a fourth constant generator 12d.

In this circuit arrangement, the vertical direction low pass filter 6d may be a digital filter having such a transfer function as expressed below;

$$Fvl(Z)=(\tfrac{1}{2})\cdot(1+Z^{-1})^2$$

and the horizontal direction high-pass filter 6ee may be a digital filter having such a transfer function as expressed below:

$$Fhh(Z)=1-Z^{-4}$$

The horizontal direction high-pass filter 6ee is chosen so as to extract a frequency component equal to half the frequency of the color subcarrier in the horizontal direction.

On the other hand, the horizontal direction band-pass filter 6i may be a digital filter having a such a transfer function as expressed below;

$$Fdh(Z)=1-Z^{-4}$$

and the vertical direction high-pass filter 6gg may be a digital filter having such a transfer function as expressed below:

$$Fvh(Z)=1-Z^{-2i}$$

The vertical direction high-pass filter 6gg is chosen so as to extract a frequency component equal to half the frequency of the color subcarrier in the vertical direction.

The horizontal direction low pass filter 6h may be a digital filter having such a transfer function as expressed below;

$$Fhu(z) = (\tfrac{1}{4})\cdot(1+Z^{-2})^2$$

and the vertical direction band-pass filter 6f may be a digital filter having such a transfer function as expressed below:

$$Fdv(Z) = 1 - Z^{-2t}$$

Referring still to FIG. 13, the first and second comparators 11a and 11b provide their respective outputs 119 and 124 to different input terminals of the vertical direction correlation detector 13a, whereas the third and fourth comparators 11c and 11d provide their respective outputs 130 and 135 to different input terminals of the horizontal direction correlation detector 13b. The vertical and horizontal direction correlation detectors 13a and 13b feed their respective outputs 136 and 137 to associated input terminals of the determining circuit 14 which in turn provides its output 110 to the switching circuit 8 shown in FIG. 3.

The determining circuit 14 used in the picture correlation determining means 7a shown and described with reference to FIG. 13 may be of the construction shown and described with reference to any one of FIGS. 5 and 6.

The picture correlation determining means 7a which controls the switching circuit 8 as above described above operates in the following manner.

Assuming that the non-correlated energy in the vertical direction and the non-correlated energy in the horizontal direction are expressed by Dv(Z) and Dh(Z), respectively, they will be expressed as follows with the use of transfer functions by the introduction of approximated absolute values:

$$Dv(Z) = |1 - Z^{-2t}|$$

$$Dh(Z) = |1 + Z^{-4}|$$

The above equations represent respective filtering characteristics necessary to block both a direct current component and a frequency component of the color subcarrier in the vertical direction and the horizontal direction. In these equations, Dv(Z) can be obtained from the vertical direction band-pass filter 6f and the absolute value circuit 10b, whereas Dh(Z) can be obtained from the horizontal direction band-pass filter 6i and the absolute value circuit 10d.

Also, Assuming that the energy of the high frequency luminance signal in the horizontal direction and the energy of the high frequency luminance signal in the vertical direction are expressed by DYh(Z) and DYv(Z), respectively, they will be expressed as follows with the use of transfer functions by the introduction of approximated absolute values:

$$DYh(Z) = |(\tfrac{1}{4})\cdot(1+Z^{-t})^2\cdot(1-Z^{-4})|$$

$$DYv(Z) = |(\tfrac{1}{4})\cdot(1+Z^{-2})^2\cdot(1-Z^{-2t})|$$

It is to be noted that DYh(Z) can be obtained from the vertical direction low-pass filter 6d, the horizontal high-pass filter 6ee and the absolute value circuit 10a whereas DYv(Z) can be obtained from the vertical direction high-pass filter 6gg, the horizontal direction low-pass filter 6h and the absolute value circuit 10c.

The vertical direction correlation detector 13a determines that there is a correlation in the vertical direction and then, provides a logical signal "1" to the determining circuit 14 when the following relationships are established.

$$Dv(Z) \leq Kd1, \text{ and}$$

$$DYh(Z) \geq Kdy1$$

(wherein Kd1 represents the correlation threshold constant and Kdy1 represents a threshold constant of the high frequency signal energy.)

When one of the following relationship are established, the vertical direction correlation detector 13a determines that there is no correlation in the vertical direction and therefore, provides a logical signal "0" to the determining circuit 14.

$$Dv(Z) > Kd1, \text{ or}$$

$$DYh(Z) < Kdy1$$

In contrast, the horizontal direction correlation detector 13b determines that there is a correlation in the horizontal direction, and therefore, provides a logical signal "1" when the following relationships are satisfied.

$$Dh(Z) \leq Kd2, \text{ and}$$

$$DYv(Z) \geq Kdy2$$

(wherein Kd2 represents the correlation threshold constant and Kdy2 represents a threshold constant of the high frequency signal energy.)

However, if any of the following relationships are established, the horizontal direction correlation detector 13b determines that there is no correlation in the horizontal direction and, therefore, provides a logical signal "0" to the determining circuit 14.

$$Dh(Z) > Kd2, \text{ or}$$

$$DYv(Z) < Kdy2$$

Dependent upon the result of the detection of the correlation made by the vertical and horizontal correlation detectors 13a and 13b as described above, the determining circuit 14 controls the switching circuit 8 in the following manner.

The relationship between the input and output of the determining circuit 14 of FIG. 5 used in the determining means 7a is such as shown in FIG. 14. When the output from the NOR gate 15 in FIG. 5 is "1", the switching circuit 8 in FIG. 3 is in position to connect the switch with the signal line 109 so that the output from the horizontal and vertical direction chrominance signal separator 6c can be outputted. However, when the output from the NOR gate 15 is "0", the switch is changed over by the output from the NOT gate 16a. When the output from the NOT gate 16a is "0" or "1" and the output from the NOR gate 15 is "0", the output from the horizontal direction chrominance signal separator 6b or the output from the vertical direction chrominance signal separator 6a can be outputted, respectively. In this example, the output C(Z) from the switching circuit 8 varies in the following manner.

If there is a correlation in the horizontal direction, $$C(Z) = Ch(Z),$$

When there is no correlation in the horizontal direction,
C(Z)=Cv(Z) if there is the correlation in the vertical direction or
C(Z)=Chv(Z) if there is no correlation in the vertical direction, wherein Cv(Z), Ch(Z) and Chv(Z) represent the transfer functions of the chrominance signal separators 6a, 6b and 6c of FIG. 3, respectively.

On the other hand, in the determining circuit 14 of FIG. 6 used in the determining means 7a, the relationship between the input and the output is such as shown in FIG. 15. The output from the exclusive NOR gate 17 in FIG. 6 is, as is the same as the output from the NOR gate 15 shown in FIG. 5, utilized in the switching circuit 8 in FIG. 3 to switch on and off the output from the horizontal and vertical chrominance signal separator 6c, whereas the output from the NOT gate 16b is the same as the output from the NOT gate 16a shown in FIG. 5, utilized to select one of the outputs from the respective horizontal and vertical direction chrominance separators 6b and 6a. Accordingly, in this example, the output C(Z) from the switching circuit 8 varies in the following manner.

If there is a correlation in the horizontal direction, but not in the vertical direction, $$C(Z) = Ch(Z).$$

If there is a correlation in the vertical direction, but not in the horizontal direction, $$C(Z) = Cv(Z).$$

If there is the correlation in both the horizontal and vertical directions, or no correlation in both, $$C(Z) = Chv(Z).$$

The chrominance signal outputted from the switching circuit 8 is subtracted in the subtracting circuit 9a from the composite video signal, included in the output 112 from the compensating delay circuit 5f, to give the luminance signal 113.

The determining circuit 14 used in the picture correlation determining means 7a shown in and described with reference to FIG. 13 may be of the construction shown and described with reference to either FIGS. 9 or 10. In this embodiment, the determining means 7a operates in a manner similar to that described in connection with that in FIG. 13 and the determining circuit 14 operates in a manner similar to that described in connection with that in FIGS. 9 and 10.

The determining circuit 14 used in the picture correlation determining means 7a shown and described with reference to FIG. 13 may also be of the construction shown and described with reference to either FIGS. 11 or 12. In this embodiment, the determining means 7a operates in a manner similar to that described in connection with that in the FIG. 13 and the determining circuit 14 operates in a manner similar to that described in connection with that in the FIGS. 11 and 12.

Although the present invention has fully been described in connection with the preferred embodiments with reference to the accompanying drawings used only for the purpose of illustration, those skilled in the art will readily conceive numerous changes and modifications within the framework of obviousness upon the reading of the specification herein presented of the present invention. By way of example, although in the foregoing description reference has been made to the sampling of the composite color television signal at a frequency that is equal to four times the frequency of the color subcarrier synchronized with the horizontal scanning frequency, it may not be always limited to four times the color subcarrier frequency as far as the sampling points when viewed on the screen represent a grid-shaped pattern on the screen.

Also, the foregoing is an example of the use of digital filters and the present invention may be practiced with the use of a desired number of filtering stages.

Accordingly, such changes and modifications are, unless they depart from the spirit and scope of the present invention as delivered from the claims annexed hereto, to be construed as included therein.

We claim:

1. A filtering circuit for separating from a composite color television signal both luminance and chrominance signals, comprising:

input terminal means for receiving a composite video signal;

an output terminal;

delay means, operatively connected to said input means, for delaying the composite color television signal;

first filter means, responsive to said composite video signal and the delayed composite video signal, for extracting a chrominance signal corresponding to a frequency component of a color subcarrier in a vertical direction;

second filter means, responsive to at least the delayed composite video signal, for extracting a chrominance signal corresponding to a frequency component of a color subcarrier in a horizontal direction;

third filter means, responsive to said composite video signal, for extracting a chrominance signal corresponding to a frequency component of a color subcarrier in both the vertical and horizontal directions;

determining means, responsive to said composite video signal and the delayed composite video signal, for detecting a correlation of a televised picture in the vertical direction and a correlation of the televised picture in the horizontal direction and for outputting a switching signal; and switching means, responsive to said switching signal for selecting one of the chrominance signals extracted from either said first, second or third filter means to be supplied to said output terminal;

said composite video signal supplied to the input terminal being sampled at a predetermined frequency synchronized with a horizontal scanning frequency so that sampling points can represent a generally grid-like arrangement on a television screen;

said delay means being utilized to simultaneously give a sampled value of a sampling point of interest at which the luminance signal and the chrominance signal are to be separated and respective sampled values of reference sampling points which linearly align on the television screen with the sampling point of interest in the vertical direction;

said determining means receiving a sampled value of the sampling point of interest and respective sampled values of the reference sampling points from said delay means;

said determining means including, first detecting means for removing both a direct current component in the vertical direction at the sampling point of interest and a frequency component corresponding to a component of the color subcarrier and for detecting a non-correlated energy in the vertical direction by determining an absolute value thereof, second detecting means for extracting a frequency component which is low in frequency in the vertical direction at the sampling point of interest and which corresponds to half the frequency of the color subcarrier in the horizontal direction and for detecting the energy of a high frequency luminance signal in the horizontal direction by determining an absolute value thereof, third detecting means for comparing the non-correlated energy in the vertical direction with a first predetermined value and for comparing the energy of a high frequency luminance signal in the horizontal direction with a second predetermined value, said third detecting means determining a correlation in the vertical direction when said non-correlated energy in the vertical direction is smaller than said first predetermined value and when the energy of the high frequency luminance signal in the horizontal direction is greater than said second predetermined value, fourth detecting means for removing both a direct current component in the horizontal direction at the sampling point of interest and a frequency component corresponding to a component of the color subcarrier and for detecting a non-correlated energy in the horizontal direction by determining an absolute value thereof, fifth detecting means for extracting a frequency component which is low in frequency in the horizontal direction at the sampling point of interest and equal to half the frequency of the color subcarrier in the vertical direction and for detecting the energy of a high frequency luminance signal in the vertical direction by determining an absolute value thereof, and sixth detecting means for comparing the non-correlated energy in the horizontal direction with a third predetermined value and for comparing the energy of the high frequency luminance signal in the vertical direction with a fourth predetermined value, said sixth detecting means determining a presence of the correlation in the horizontal direction when said non-correlated energy in the horizontal direction is smaller than said third predetermined value and when the energy of the high frequency luminance signal in the vertical direction is greater than said fourth predetermined value.

2. The filtering circuit as claimed in claim 1, wherein said determining means is operable in response to a result of detection made by said third detecting means and a result of detection made by said sixth detecting means to select either an output from one of said first, second or third filter means according to a result of detection as to the presence or absence of the correlation in the horizontal and vertical direction.

3. The filtering circuit as claimed in claim 1, wherein said determining means is operable to output a control signal necessary to select one of the outputs from either said first, second or third filter means by delaying respective outputs from said third and sixth detecting means for a predetermined period of time to simultaneously give results of detection of correlations in the vertical and horizontal directions at a plurality of sampling points which linearly lie in the vertical and horizontal directions on the screen;

said determining means removing an isolating point in a predetermined direction by modifying a result of decision as to the presence or absence of the correlation in the horizontal and vertical directions according to the result of detection, thereby selecting one of the outputs from either said first, second or third filter means according to a result of the modification.

4. The filtering circuit as claimed in claim 3, wherein said determining means comprises:

first delay means for delaying the output from said third detecting means to simultaneously give results of detection of the correlations in the vertical direction at the plurality of the sampling point which lie linearly in the vertical direction on the screen;

first removing means for removing the isolating point in the vertical direction by modifying the result of detection of the correlation in the vertical direction at the sampling point of interest when the result of detection of the correlation in the vertical direction at the sampling point of interest indicates that there is a correlation and when the result of detection of the correlation in the vertical direction at the predetermined reference sampling points positioned above and below the sampling point of interest indicates that there is no correlation;

second delay means for delaying the output from said sixth detecting means to simultaneously give results of detection of the correlations in the horizontal direction at the plurality of the sampling points which lie linearly in the horizontal direction on the screen; and second removing means for removing the isolating point in the horizontal direction by modifying the result of detection of the correlation in the horizontal direction at the sampling point of interest when the result of detection of the correlation in the horizontal direction at the sampling point of interest indicates that there is a correlation and when the result of detection of the correlation in the horizontal direction at the predetermined reference sampling points positioned on respective sides of the sampling point of interest indicates that there is no correlation.

5. The filtering circuit as claimed in claim 3, wherein said determining means comprises:

first and second delay means for delaying the outputs from said third and sixth detecting means, respectively, for a predetermined time to simultaneously give results of detection of the correlations in the vertical and horizontal directions at the plurality of the sampling points which lie linearly in the vertical and horizontal directions at the plurality of the sampling points which lie linearly in the vertical and horizontal directions on the screen;

first removing means for removing the isolating points in the vertical direction either by modifying the result of detection of the correlation in the vertical direction at the sampling point of interest when the results of detection of the correlation in the vertical direction at the sampling point of interest indicates that there is a correlation and when the result of detection of the correlation in the vertical direction at the predetermined reference sampling points positioned above and below the sampling point of interest indicates that there is no correlation or by modifying the result of detection of the correlations in the vertical direction at the sampling point of interest when the result of detection of the correlation in the vertical direction at the sampling point of interest indicates that there is no correlation and when the result of detection of the correlation in the vertical direction at the predetermined reference sampling points positioned above and below the sampling point of interest indicates that there is a correlation; and second removing means for removing the isolating points in the horizontal direction either by modifying the result of detection of the correlation in the horizontal direction at the sampling point of interest when the result of detection of the correlation in the horizontal direction at the sampling point of interest indicates that there is a correlation and when the result of detection of the correlation in the horizontal direction at the predetermined reference sampling points positioned on respective sides of the sampling point of interest indicates that there is no correlation or by modifying the result of detection of the correlation in the horizontal direction at the sampling point of interest when the result of detection of the correlation in the horizontal direction at the sampling point of interest indicates that there is no correlation and when the result of detection of the correlation in the horizontal direction at the predetermined reference sampling points positioned on respectives sides of the sampling point of interest indicates that there is a correlation.

* * * * *